(12) United States Patent
Nakamura (10) Patent No.: US 6,269,418 B1
(45) Date of Patent: Jul. 31, 2001

(54) PRIORITY-BASED SHARED BUS REQUEST SIGNAL MEDIATING CIRCUIT (75) Inventor: Tsutomu Nakamura, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/115,300

(22) Filed: Jul. 14, 1998

(30) Foreign Application Priority Data

Jul. 14, 1997 (JP) .................................................... 9-188723

(51) Int. Cl.[7] .................................................. G06F 13/36
(52) U.S. Cl. .......................... 710/113; 710/240; 710/241
(58) Field of Search ................... 710/113, 240, 710/241

(56) References Cited

U.S. PATENT DOCUMENTS 5,025,370 * 6/1991 Koegel et al. .

FOREIGN PATENT DOCUMENTS

| 55-041039 | * | 3/1980 | (JP) . |
| 63-116260 |   | 5/1988 | (JP) . |
| 1189750   |   | 7/1989 | (JP) . |
| 31268     |   | 1/1991 | (JP) . |
| 3-002949  | * | 1/1991 | (JP) . |
| 338760    |   | 2/1991 | (JP) . |
| 4-42342 A | * | 2/1992 | (JP) . |
| 4-52749   |   | 2/1992 | (JP) . |
| 5-143526  |   | 6/1993 | (JP) . |
| 5151153   |   | 6/1993 | (JP) . |
| 11-031123 | * | 2/1999 | (JP) . |

OTHER PUBLICATIONS

Japanese Office Action dated Feb. 15, 2000.
English translation of portions of Feb. 15, 2000 Japanese Office Action.

* cited by examiner

Primary Examiner—Ario Etienne
(74) Attorney, Agent, or Firm—Ostrolenk, Faber, Gerb & Soffen, LLP (57) ABSTRACT A bus request signal mediating circuit comprises an input section for latching a plurality of bus request signals occurring within a certain period of time and for suppressing a new input of bus request signals occurring outside the certain period before the processing for all of the input bus request signals is completed. A plurality of bus request signals which are input within the certain period of time are processed consecutively based on the priority among the bus request signals stored in the register.

8 Claims, 5 Drawing Sheets

PRIORITY-BASED SHARED BUS REQUEST SIGNAL MEDIATING CIRCUIT

BACKGROUND OF THE INVENTION

(a) Field of the Invention

The present invention relates to a bus request signal mediating circuit and, more particularly, to a bus request signal mediating circuit for mediating between a plurality of bus accessing circuits sharing a single bus line.

(b) Description of the Related Art

When a single bus is shared among a plurality of bus accessing circuit, a bus request signal mediating circuit is generally used for mediating the use of the single bus by the plurality of accessing circuits. An example of such a bus request signal mediating circuit is described in JP-A-4 (1992)-52749.

Figure 1:
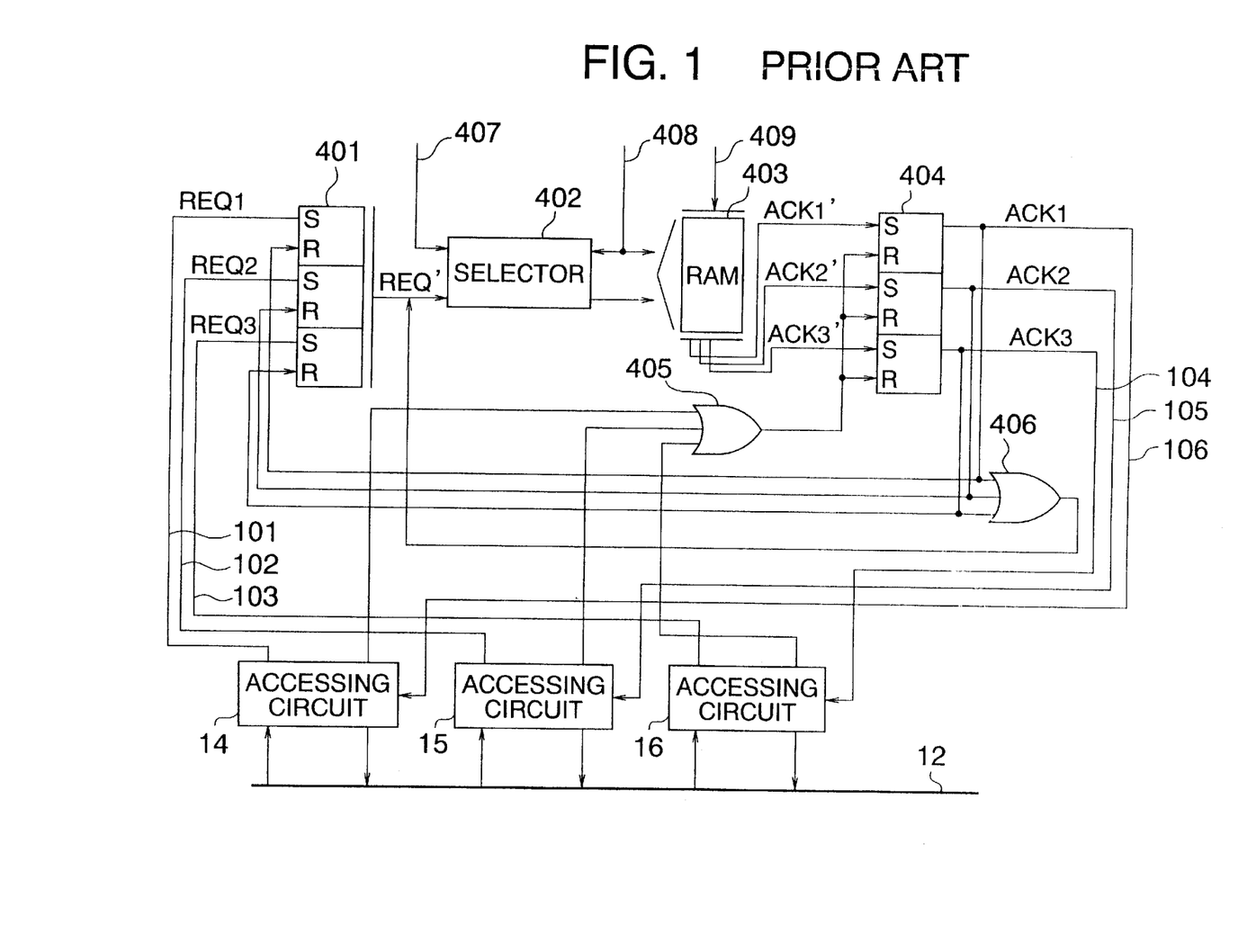
FIG. 1 is a block diagram of a conventional bus request signal mediating circuit.

FIG. 1 shows the bus request signal mediating circuit described in the publication mentioned above. The bus request signal mediating circuit is provided for mediating between three accessing circuits 14, 15 and 16, and comprises a first register section 401 for latching bus request signals 101, 102 and 103, a selector 402 for selecting one of the bus request signals from first register section 401 based on a control signal 407 specifying the address of first register section 401, a RAM 403 for storing the priority data between the bus request signals in memory cells which are accessed by the address specified by an output from selector 402, and a second register section 404 for latching outputs from RAM 403 to deliver a bus use authorization signal to one of the bus accessing circuits 14, 15 and 16.

When any number of accessing circuits 14, 15 and 16 output bus request signals 101, 102 and/or 103, the bus request signals are latched by first register section 401 and input to RAM 403 through selector 402 as an address signal for RAM 403. RAM 403 delivers an authorization signal 104, 105 or 106 to one of accessing circuits 14, 15 and 16 through register 404 based on the bus request signals and the priority stored in RAM 403 among the bus request signals 101, 102 and 103.

An OR gate 406 suppresses an output from first register section 401 while second register section 404 delivers the authorization signal, thereby suppressing further inputs from other accessing circuits. After the specified accessing circuit finishes the processing using bus line 12, OR gate 405 delivers an end signal to reset register 404, which enables further mediating operation between the bus request signals 101, 102 and 103. The priority data stored in RAM 403 can be updated by a new priority data 409, which is supplied from outside the mediating circuit by using a control signal 408 to switch the input of selector 402 to an address signal 407.

The bus request signal mediating circuit as described above has a problem in that if the highest priority accessing circuit outputs the accessing signal in succession, the bus line cannot be used by other lower priority accessing circuits, resulting in monopoly of the single bus by the highest priority accessing circuit.

In addition, if the number of accessing circuits increases due to a complicated circuit configuration, update of the priority data consumes a large amount of time due to a large number of bits to be stored in the RAM.

SUMMARY OF THE INVENTION

It is therefore an object of the present invention to provide a bus request signal mediating circuit which is capable of preventing the monopoly of a bus line by a higher priority accessing circuit and capable of updating the priority data with a reduced time length.

The present invention provides a bus request signal mediating circuit comprising a latch section for latching a plurality of bus request signals from respective bus accessing circuits, a priority data storage section for storing priority data specifying priority among the plurality of bus request signals, a mediating section for mediating the plurality of bus request signals based on the priority data, an authorization section for allowing the bus accessing circuits to use a bus line in an order of a result of mediation by the mediating section, and a bus request signal suppressing section for preventing the latch section from receiving a new bus request signal occurring after a predetermined time interval and prior to a completion of all pending bus request signals received within the predetermined time interval, the predetermined time interval being defined as the time which begins with receipt of a first one of the plurality of bus request signals and ends after a predetermined delay.

In accordance with the bus request signal mediating circuit of the present invention, when a plurality of accessing circuits deliver bus request signals at the same time, the bus request signal mediating circuit suppresses a further bus request signal from any of the accessing circuits until the accesses by the then existing bus request signals are completed. The suppression applies to all of the accessing circuits, and thus a new bus request signal is inhibited until the lowest priority bus request signal is processed successive to the processing for the higher priority bus request signal.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings, wherein similar constituent elements are designated by the same reference numerals throughout the drawings.

Figure 2:
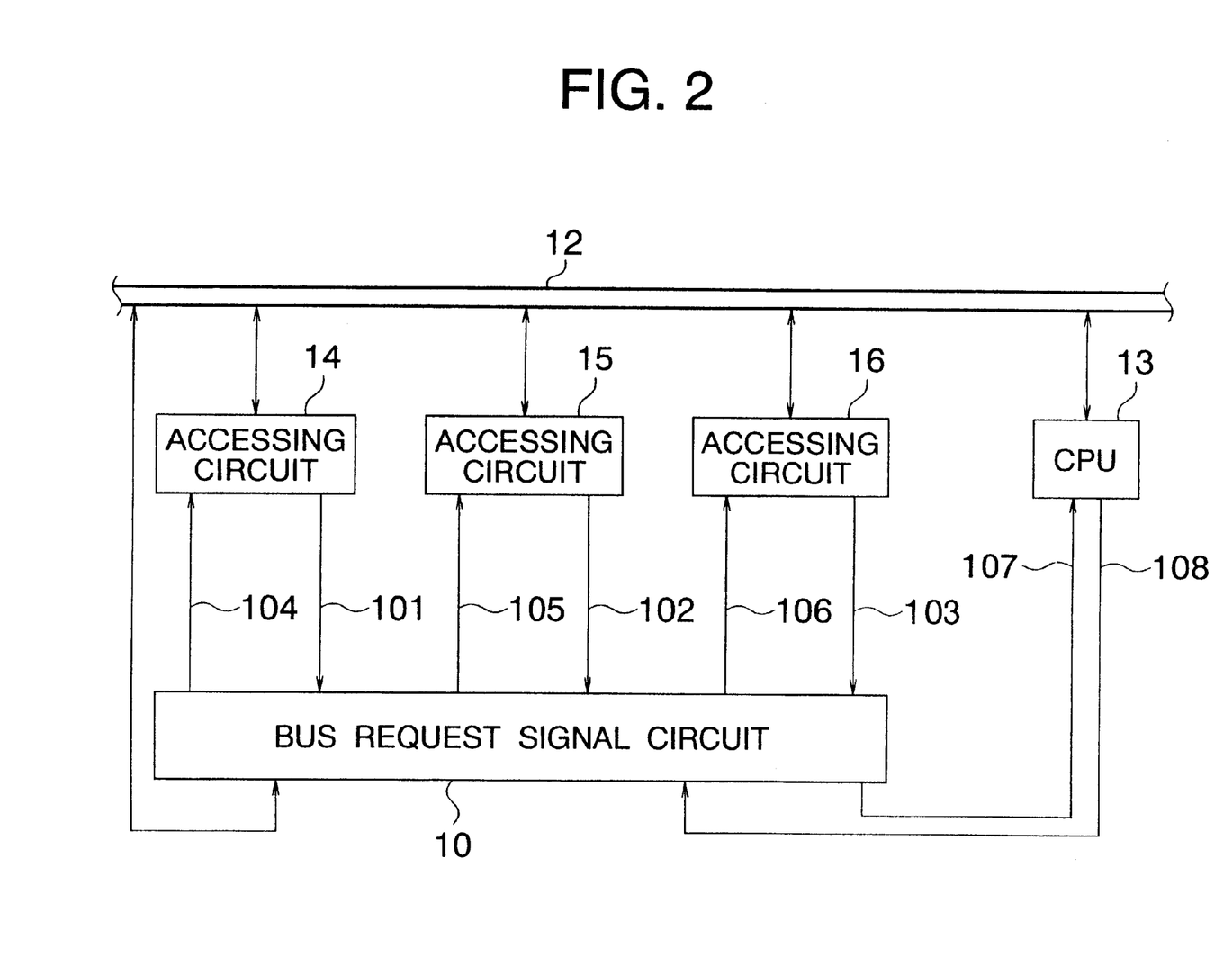
FIG. 2 is a block diagram of a CPU system including a bus request signal mediating circuit according to an embodiment of the present invention.

Referring to FIG. 2, a bus request signal mediating circuit 10 according to an embodiment of the present invention is provided in a CPU system for a plurality of (three in this example) bus accessing circuits 14, 15 and 16. Bus accessing circuits 14, 15 and 16, bus request signal mediating circuit 10 and central processing unit (CPU) are connected to a bus line 12 for delivering data by using bus line 12.

Each accessing circuit 14, 15 or 16 outputs a bus request signal 101, 102 or 103 for obtaining allowance to use bus line 12, and receives an authorization signal 104, 105 or 106 from bus request signal mediating circuit 10 is the request is authorized. Each bus accessing circuit 14, 15 or 16 continues to deliver its own bus request signal 101, 102 or 103 until its processing by using bus line 12 is completed.

Bus request signal mediating circuit 10 delivers a bus release request signal 107 to CPU 13 when bus request signal mediating circuit 10 receives a bus request signal 104, 105 or 106 from one of accessing circuits 14, 15 and 16. If bus request signal mediating circuit 10 receives a bus release response signal 108 from CPU 13, bus request signal mediating circuit 10 delivers an authorization signal 104, 105 or 106 to one of bus accessing circuits 14, 15 and 16 based on the priority stored therein among accessing circuits 14, 15 and 16.

Figure 3:
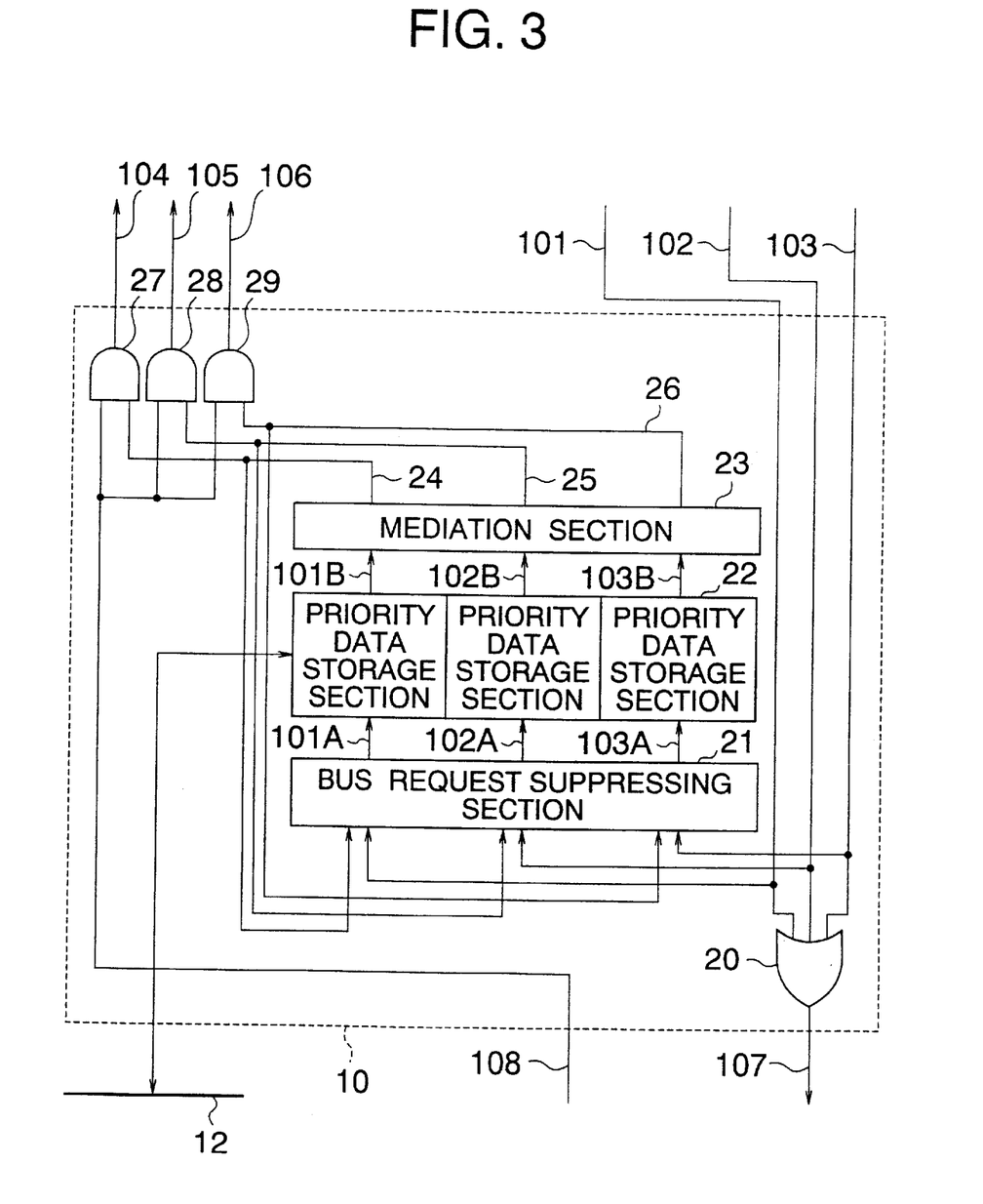
FIG. 3 is a block diagram of the bus request signal mediating circuit shown in FIG. 2.

Referring to FIG. 3, bus request signal mediating circuit 10 comprises an OR gate 20, a bus request suppressing section 21, a priority data storage section (register) 22 for storing priority data, a mediating section 23, and three AND gates 27, 28 and 29. OR gate 20 receives bus request signals 101, 102 and 103 to output a bus release request signal 107 to CPU 13.

Bus request suppressing section 21 receives and latches any of the input bus request signals 101, 102 and 103, to relay the same to priority data storage section 22 which stores priority data among bus accessing circuits 14, 15 and 16. Bus request suppressing section 21 suppresses the input of a new bus request signal 101, 102 or 103 while bus suppressing section 21 relays one or more of bus request signals 101A, 102A and 103A. Bus request suppressing section 21 receives mediated signals 24, 25 and 26 from mediating section 23, and clears the latched bus request signal 101A, 102A and 103A after the bus request signal 101, 102 and 103 from accessing circuit are stopped, which enables a new bus request signal 101, 102 or 103 to be input to the bus request signal mediating circuit 10.

When one or more of new bus request signals are input within a small period of time from the time instant of occurrence of a precedent bus request signal, the new bus request signals are regarded as simultaneous signals with the precedent bus request signal, and the new and precedent bus request signals are relayed to priority data storage section 22 simultaneously. For example, if bus request signals 101 and 102 are input within a certain period of time from each other, and bus request signal 103 is input after more than the certain period of time elapsed since the input of the bus request signal 101 or 102 which is first input, then bus request suppressing section 21 relays bus request signals 101 and 102 to priority data storage section 22, and does not relay bus request signal 103 unless processing for the existing bus request signals 101 and 102 is completed.

Priority data storage section 22, implemented by a register group, outputs priority data stored therein when priority data storage section 22 receives one or more bus request signals 101A, 102A and 103A relayed by bus request suppressing section 21. The output 101B, 102B or 103B of the priority data notifies mediating section 23 of the new occurrence of the bus request signals. When mediating section 23 receives a priority data 101B, 102B or 103B from priority data storage section 22, mediating section 23 delivers a mediated signal 24, 25 or 26 to AND gates 26, 28 and 29. If three bus request signals 101, 102 and 103 are generated at the same time, bus request signal mediating circuit 10 delivers a first mediated signal 24 corresponding to the highest priority bus request signal 101, then outputs a second mediated signal 25 corresponding to the second highest priority bus request signal 102 after the processing for the highest priority bus request signal 101 is completed, and outputs the third mediated signal 26 corresponding to the lowest priority bus request signal 103 after the processing for the higher priority bus request signal 102 is completed.

When one of AND gates 27, 28 and 29 receives a corresponding mediated signal 24, 25 or 26 together with a bus release response signal 108, the one of AND gates 27, 28 and 29 outputs an authorization signal 104, 105 or 106 to the corresponding accessing circuit 14, 15 or 16. Bus accessing circuit 14, 15 or 16, after receiving the authorization signal 104, 105 or 106, starts for processing by using bus line 12 and stops the bus request signal after the processing is completed.

In a normal operation mode of a typical CPU system, bus line 12 is generally used by CPU 13. If one of bus accessing circuits 14, 15 and 16 in FIG. 2 has a task which necessitates use of bus line 12, the one of accessing circuits 14, 15 and 16 delivers a bus request signal 101, 102 or 103. When bus request signal mediating circuit 10 receives one or more of the bus request signals, bus request signal mediating circuit 10 outputs a bus release request signal 107 to CPU 13 through OR gate 20. CPU 13 then releases bus line 12 after finishing its own task then being executed, and notifies bus mediating circuit 10 of the bus release by delivering a bus release response signal 108.

Table 1 shows the priority among the bus request signals, wherein accessing circuits 14, 15 and 16, order of priority and the priority data stored in priority data storage section 22 are tabulated.

TABLE 1

| Accessing circuit | Priority | Priority data |
| --- | --- | --- |
| Circuit 14 | 1 | 100 |
| Circuit 15 | 2 | 010 |
| Circuit 16 | 3 | 001 |

It is assumed in operation of the CPU system of FIG. 2 that all of accessing circuits 14, 15 and 16 deliver accessing signals 101, 102 and 103 within a small length of time, i.e., substantially at the same time. Bus request signals 101, 102 and 103 are input to OR gate 20 simultaneously, which outputs a bus release request signal 107 to CPU 13. CPU 13 then releases bus line 12 after finishing its own task, and delivers a bus release response signal 108 to bus request signal mediating circuit 10. Bus request signals 101, 102 and 103 are also input to bus request suppressing section 21.

Bus request suppressing section 21 latches the bus request signals 101, 102 and 103 within a certain period of time, then relays the same to priority data storage section 22. Bus request suppressing section 21 then inhibits occurrence of a new bus request signal for a small period of time after the first occurrence of the bus request signal. Priority data storage section 22 outputs the priority data, wherein bus request signals 101, 102 and 103 have the first, the second and the third priorities, respectively, to the mediating circuit 23. Mediating circuit 23 selects the first priority bus request signal 101 among bus request signals 101, 102 and 103 based on the priority data 101B, 102B and 103B, and supplies mediate signal 24 to AND gate 27, which responds to the mediated signal 24 and the bus release response signal 108 to output an authorization signal 104 to bus accessing circuit 14.

Bus accessing circuit 14 responds to the authorization signal 104 to start processing by using bus line 12, and stops the bus request signal 101 after the processing is completed. Bus request suppressing section 21 responds thereto to clear the first bus request signal 101, which causes deletion of relayed signal 101A, priority data 101B, mediated signal 24 and authorization signal 104. As a result, mediating circuit 23 delivers a second mediated signal 25 based on priority data 102B and 103B to AND gate 28, which responds to the mediated signal 25 and bus release signal 108 to deliver an authorization signal 105 to accessing circuit 15.

After accessing circuit 15 finishes processing by using bus line 12, accessing circuit 15 stops bus request signal 102, thus mediating section 23 stops the mediated signal 25 and delivers a mediated signal 26 to AND gate 28. Thus, AND gate 29 delivers an authorization signal 106 to accessing circuit 16, which operates for processing by using bus line 123 and stops bus request signal 103. After all the bus request signals 101, 102 and 103 pending for the processing by using bus line 12 are stopped, bus request suppressing section 21 allows a new bus request signals to enter bus request suppressing section 21. If a new bus request signal 101 or 102 is input before the stop of bus request signal 103, the new bus request signal is not allowed to enter bus request suppressing section 21 until the stop of bus request signal 103, and a similar mediating operation is performed for the new bus request signal.

Figure 4:
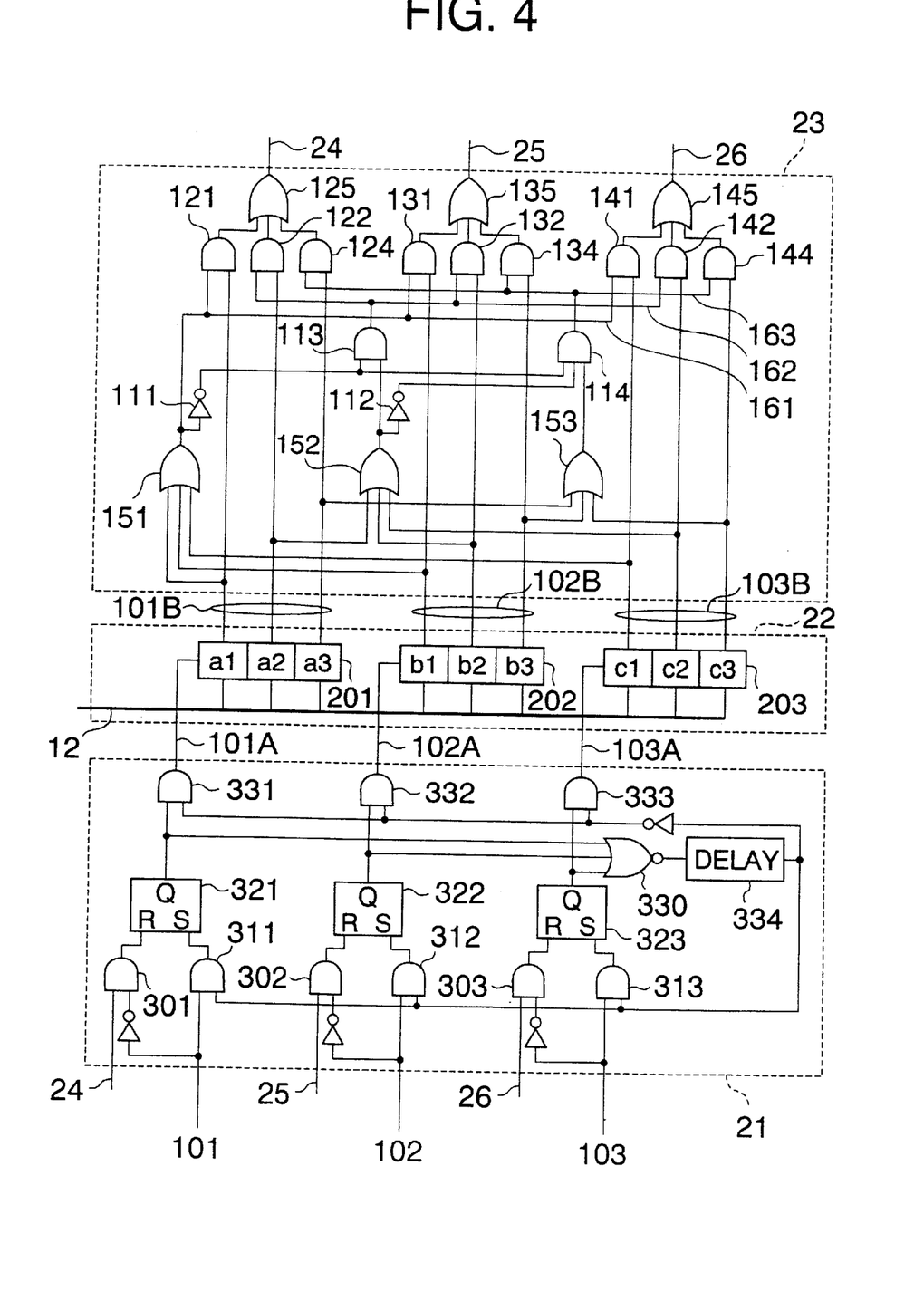
FIG. 4 is a schematic diagram of the bus request signal mediating circuit of FIG. 3.

Referring to FIG. 4, there is shown a practical configuration of bus request suppressing section 21, priority data storage section 22 and mediating section 23 in the bus request signal mediating circuit 10 of FIG. 3. Bus request suppressing section 21 comprises flip-flops 321, 322 and 323 for latching the bus request signals 101, 102 and 103, respectively. Bus request suppressing section 21 also comprises a delay gate 334 having a function for providing a time interval for regarding two or more of the bus request signals 101, 102 and 103 which are input within the time interval to be simultaneous signals. Specifically, bus request signals 101, 102 and 103 are input to the first inputs of AND gates 311, 312 and 313, respectively, which also receive an output from delay gate 334 at respective second inputs. Outputs from AND gates 311, 312 and 313 are input to respective flip-flops 321, 322 and 323, the outputs of which are supplied to delay gate 334 through NAND gate 330. Delay gate 334 delivers output of "0" with a time delay and "1" without the time delay. The bus request signals 101, 102 and 103 are input to or rejected from respective flip-flops 321, 322 and 323 depending on "1" or "0" of the output from delay gate 334.

Outputs from flip-flops 321, 322 and 323 are supplied to priority data storage section 22 through respective AND gates 331, 332 and 333, which also receive the output from delay gate 334 through inverter at respective other inputs. When a certain time length specified by the time delay elapsed since a first occurrence of bus request signals which sets the output of NAND gate 330 at "0", AND gate 331, 332 and 333 delivery their outputs simultaneously to priority data storage section 22. Reset signals for flip-flops 321, 322 and 323 are supplied from AND gates 301, 302 and 303, respectively, which receive inverted signals of bus request signals 101, 102 and 103 at respective first inputs and mediated signals 24, 25 and 26 at respective second inputs. In this configuration, if a bus request signal 101, 102 or 103 is stopped while corresponding mediated signal 24, 25 or 26 is input, AND gate 301, 302 or 303 delivers a reset signal to flip flop 321, 322 or 322.

As shown in Table 1, priority data is expressed by a binary number for each priority order of the bus request signals, wherein the digit assuming a bit "1" shows the priority order. For implementing this configuration, priority data storage section 22 comprises registers 201, 202 and 203 in number (three) corresponding to the number of accessing circuits 14, 15 and 16, each register having a number (three) of bits corresponding to the number of accessing circuits 14, 15 and 16.

Each of registers 201, 202 and 203 is set for storing the priority data through bus line 12. A common priority data setting is prohibited between each two of registers 202, 202 and 203. Each output 101A, 102A or 103A from AND gate 331, 332 or 333 of bus request suppressing section 21 is input to a corresponding register 201, 202 or 203 as an enable signal for enabling the priority data to be output from the register.

Mediating section 23 comprises OR gates 151, 152 and 153 each receiving corresponding bits of outputs 101B, 102B and 103B from three registers 201, 202 and 203, inverters 111 and 112 receiving outputs from OR gates 151 and 152, respectively, AND gate 113 for receiving outputs from inverter 111 and OR gate 152, AND gate 114 for receiving outputs from inverter 111, inverter 112 and OR gate 153, and three mediating blocks. Each bit a1, a2 or a3 of register 201 is input to a first input of a corresponding AND gate 121, 122 or 124 of the first mediating block, which also receives an output from OR gate 151, AND gate 113 or AND gate 114 at a second inputs thereof. Similarly, each bit b1, b2 or b3 of register 202 is input to a first input of a corresponding AND gate 131, 132 or 134 of the second mediating block, which also receives an output from OR gate 151, AND gate 113 or AND gate 114 at a second input thereof. Similarly, each bit c1, c2 or c3 of register 203 is input to a first input of a corresponding AND gate 141, 142 or 144 of the third mediating block, which also receives an output from OR gate 151, AND gate 113 or AND gate 114 at a second input thereof. And OR gate 125 receives outputs from AND gates 121, 122 and 124 of the first mediating block, an OR gate 135 receives outputs from AND gates 131, 132 and 134 of the second mediating block and an OR gate 145 receives outputs from AND gates 141, 142 and 144 of the third mediating block, OR gate 125 of the first mediating block, OR gate 135 of the second mediating block and OR gate 145 of the third mediating block outputting respective mediated signals 24, 25 and 26.

Mediating section 23 selects the highest priority data among the simultaneous outputs from registers 201, 202 and 203. Specifically, if one of registers 201, 202 and 203 is enabled to output a priority data 101B, 102B or 103B, a corresponding mediating block delivers a mediated signal 24, 25 or 26, wherein the first priority mediating signal 161 is output from OR gate 151, the second priority mediating signal 162 is output from AND gate 113, and the third priority mediating signal 163 is output from AND gate 114.

Figure 5:
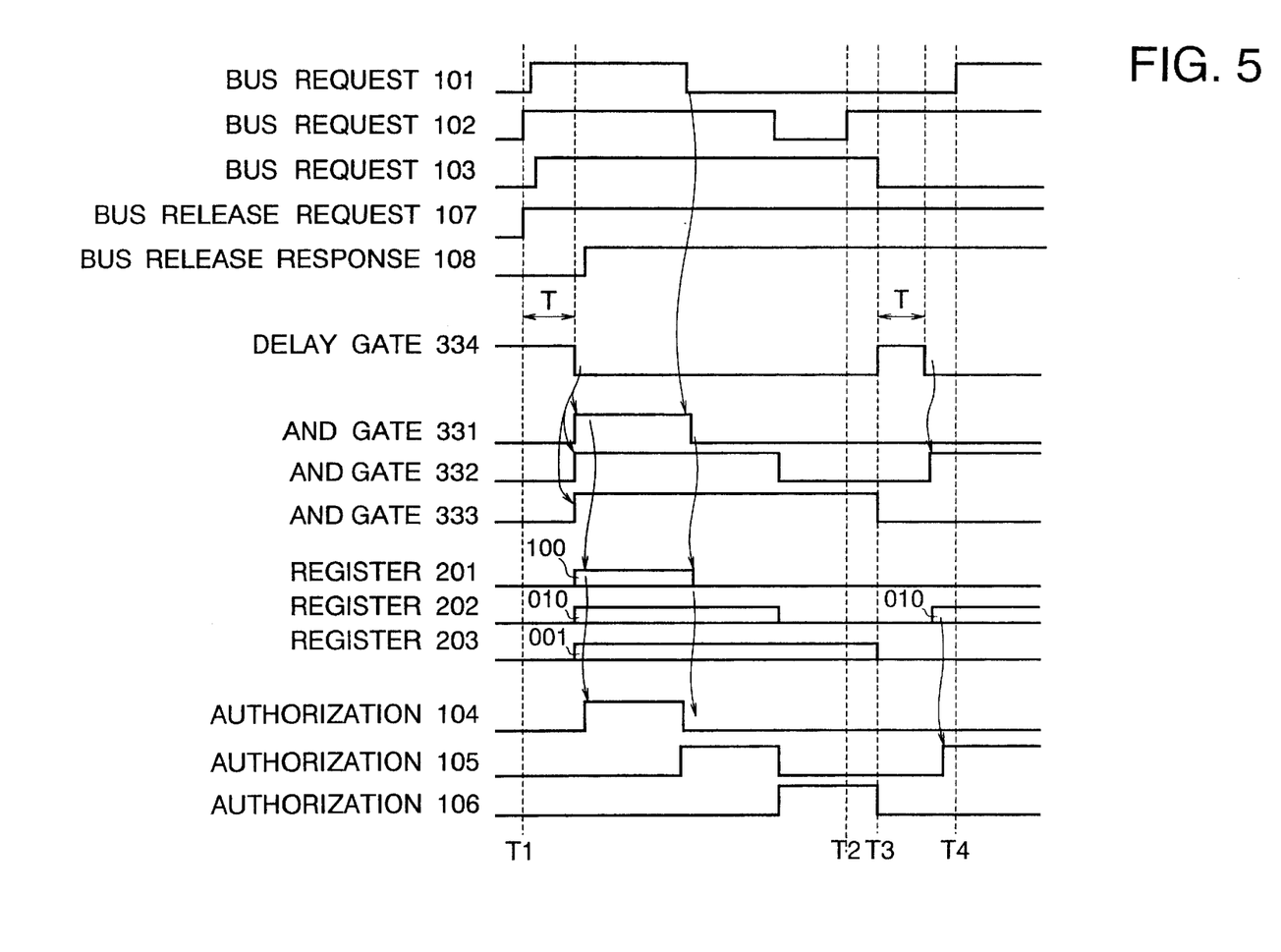
FIG. 5 is a signal timing chart of the bus request signal mediating circuit of FIG. 3.

Referring to the signal timing chart of FIG. 5, there is shown an exemplified operation of the bus request signal mediating circuit 10, wherein three bus request signals 101, 102 and 103 are generated substantially concurrently at time instant T1, i.e., within a time period T specified by delay gate 334 since the occurrence (T1) of the second bus request signal 102, after the absence of any bus request signal.

Bus request signals 101, 102 and 103 are supplied to OR gate 20, which responds to the second bus request signal 102 occurring at T1 to deliver bus release request signal 107. Bus request signals 101, 102 and 103 are latched through respective AND gates 311, 312 and 313 to respective flip-flops 321, 322 and 333, the outputs of which then enables the output of registers 201, 202 and 203 by the function of delay gate 223 and AND gates 331, 332 and 333.

The output of delay gate 334 is "0" during the time interval between the time instant T1+T and the time instant T3 at which all of flip-flops 311, 312 and 313 are reset by the mediated signals 24, 25 and 26, which disables a new bus request signal at AND gates 311, 312 and 313. This is shown by the fact that a second occurrence of the second bus request signal 102 at T2 is disabled in FIG. 5.

The output data (100) of register 201 having the first priority is input to AND gate 121, which makes the output of OR gate 151 at "1". The output "1" of OR gate 151 is delivered to AND gates 121, 131 and 141, which makes only the output of AND gate 121 at "1". The output data (010) of register 202 having the second priority makes the output of OR gates 152 at "1", whereas the output data (001) of register 203 having the third priority makes the output of OR gate 153 at "1", both outputs of which are disabled by AND gates 113 and 114, respectively, which receive the output from inverter 111. As a result, AND gates 132 and 144 receiving outputs from registers 202 and 203, respectively, are disabled, which makes only the first mediated signal 24 at "1".

The mediated signal 24 is input to AND gate 27 (in FIG. 3) and enables an authorization signal 104 to be input to accessing circuit 14 (in FIG. 2) provided that bus release response signal 108 is high. Accessing circuit 14 starts processing by using bus line 12 based on authorization signal 104, and stops the bus request signal 101 after the completion of the processing. AND gate 301 then outputs "1" based on "1" of mediated signal 24 and "0" of bus request signal 101 to reset flip-flop 321. As a result, output of register 201 is disabled to stop mediated signal 24 and authorization signal 104.

Flip-flops 322 and 323 hold respective bus request signals 102 and 103, which enable the outputs of register 202 and 203. The stop of the output of register 201 makes the output of inverted 111 at "1", which disables AND gate 113 and thus enables the output of OR gate 1102. As a result, AND gates 122, 132 and 142 receive "1", whereas the output of OR gate 153 is disabled by AND gate 114 due to "0" of the output of inverter 112. Thus, only AND gate 132 receiving "1" of priority data (010) from register 202 outputs "1" to delivery mediated signal 25 through OR gate 135. The mediated signal 25 is input to AND gate 28 in FIG. 2, which outputs an authorization signal 105 to accessing circuit 15 provided that bus release response signal is delivered from CPU 13.

Accessing circuit 15, after receiving the authorization signal 105, starts processing by using bus line 12 and stops the bus request signal 102, which resets flip-flop 322 through AND gate 302. The reset of flip-flop 322 disables the output of register 202 and stops the outputs of mediated signal 25 and the authorization signal 105.

Flip-flop holds the bus request signal 103 and register 203 still outputs the third priority data (001). The termination of disabling by inverters 111 and 112 allows "1" in the output data (001) of register 2032 to be input to AND gate 144, which outputs a mediated signal 26 and authorization signal 105.

After bus accessing is consecutively performed by accessing circuits 14, 15 and 16 based on the priority data, all the inputs of NOR gate 330 become "0" to make the input of delay gate 334 at "1", which immediately makes the output of delay gate 334 at "1". As a result, suppression of bus request signals by AND gates 311, 312 and 313 is stopped, which allows a new bus request signal to enter the bus request signal mediating circuit 10.

In the example of FIG. 5, a new second bus request signal 102 is generated at T2, which are latched after the time interval of T elapsed since the stop of the suppression at T3 and processed accordingly. Although a new first bus request signal 101 having the first priority is generated at T4 which is outside the time interval T from T3, the new second bus request signal 102 is handled first as a single bus request signal occurring within the time interval T.

During the time interval when CPU 13 uses bus line 12, priority data can be updated in registers 201, 202 and 203 from outside the bus request signal mediating circuit 10. In this embodiment, wherein three accessing circuits are provided, the overall number of bits is 3×3=9. Accordingly, the access time for updating the priority data is as low as one or two depending on 8-bit or 16-bit of the bit number for a simultaneous accessing by CPU 13.

Since the above embodiments are described only for examples, the present invention is not limited to the above embodiments and various modifications or alterations can be easily made therefrom by those skilled in the art without departing from the scope of the present invention.

What is claimed is:

1. A bus request signal mediating circuit for permitting access by a plurality of bus accessing circuits to a bus line, said circuit comprising:

a latch section for latching a plurality of bus request signals from respective bus accessing circuits;

a priority data storage section for storing priority data specifying priority among said plurality of bus request signals;

a mediating section for mediating said plurality of bus request signals based on said priority data;

an authorization section for allowing said bus accessing circuits to use said bus line in an order of a result of mediation by said mediating section; and a bus request signal suppressing section for preventing said latch section from receiving a new bus request signal occurring after a predetermined time interval, and prior to completion of processing of all pending bus request signals received within said predetermined time interval, said predetermined time interval being defined as a time period which begins with receipt of a first one of said plurality of bus request signals and ends after a predetermined delay.

2. A bus request signal mediating circuit according to claim 1, wherein said priority data is written by a central processing unit (CPU) using said bus line.

3. A bus request signal mediating circuit according to claim 2, further comprising an input gate, said input gate outputting a bus release request signal to said CPU when said input gate receives said first one of said plurality of bus request signals.

4. A bus request signal mediating circuit according to claim 1, wherein said priority data storage section comprising a quantity of registers corresponding to a quantity of said bus accessing circuits, each of said quantity of registers having a number of bits corresponding to said quantity of said bus accessing circuits.

5. A bus request signal mediating circuit according to claim 1, wherein a bus request signal is generated continuously by a bus accessing circuit which has requested bus access until said bus accessing circuit has completed its use of said bus line.

6. A bus request signal mediating circuit comprising:

a request storing section for storing a plurality of bus request signals from respective bus accessing circuits;

a priority data storage section for storing priority data specifying priority among said plurality of bus request signals;

a mediating section for mediating said plurality of bus request signals based on said priority data;

an authorization section for allowing said bus accessing circuits to use a bus line in an order determined by said mediating section; and a grouping section for grouping a succession of incoming bus request signals according to a predetermined criterion, and for preventing said request storing section from receiving additional bus request signals until all pending bus request signals in a group have been acted on by said mediating section.

7. A bus request signal mediating circuit according to claim 6 in which said grouping section includes a delay circuit for generating a predetermined time interval, said predetermined time interval beginning with receipt of a first one of said plurality of bus request signals.

8. A bus request signal mediating circuit according to claim 6, wherein said priority data is written by a central processing unit (CPU) using said bus line.

* * * * *